United States Patent [19]

Hager

[11] Patent Number: 4,666,270

[45] Date of Patent: May 19, 1987

[54] CLOSURE FOR CONTROLLING THE FLOW OF A HOT FLUID

[75] Inventor: Donald K. Hager, Emmaus, Pa.

[73] Assignee: Damper Design, Inc., Bethlehem, Pa.

[21] Appl. No.: 818,671

[22] Filed: Jan. 14, 1986

[51] Int. Cl.[4] ............................................... F16K 3/00
[52] U.S. Cl. ................................ 251/326; 126/285 A
[58] Field of Search ................... 126/285 A; 251/326, 251/327, 328, 329; 137/375

[56] References Cited

U.S. PATENT DOCUMENTS

| | | |
|---|---|---|
| 1,643,766 | 9/1927 | Fahrenwald . |
| 1,678,342 | 7/1928 | Kling et al. . |
| 1,734,450 | 11/1929 | Smith . |
| 1,798,460 | 3/1931 | Fahrenwald . |
| 1,932,243 | 10/1933 | Clark . |
| 1,934,928 | 11/1933 | Jackson . |
| 1,991,016 | 2/1935 | Fahrenwald . |
| 1,995,845 | 3/1935 | Flintermann . |
| 3,228,605 | 1/1966 | Diermayer et al. . |
| 4,351,361 | 9/1982 | Worley ........................ 137/375 X |
| 4,493,311 | 1/1985 | Bachmann . |

FOREIGN PATENT DOCUMENTS 892737 3/1962 United Kingdom ............... 251/327

*Primary Examiner*—Gerald A. Michalsky
*Attorney, Agent, or Firm*—Schwartz, Jeffery, Schwaab, Mack, Blumenthal & Evans

[57] ABSTRACT

An apparatus is disclosed for controlling the flow of a hot fluid. The apparatus includes a closure member for sliding between a closed position and an open position. The closure member has a hot section defined by the portion of the closure which is subject to impingement of hot fluid when the closure member is in the closed position and a cold section disposed outside the fluid passageway and not subject to impingement of hot fluids. The cold section includes at least one cleft which facilitates expansion of the cold section in response to expansion of the hot section due to heating by impingement of hot fluid on the hot section. This, in turn, relieves stresses and reduces the extent of distortion of the closure member.

34 Claims, 8 Drawing Figures 14,666,270

CLOSURE FOR CONTROLLING THE FLOW OF A HOT FLUID

BACKGROUND OF THE INVENTION

1. Field of the Invention

The present invention relates to controlling the flow of a hot fluid and, in particular, to a closure member for an apparatus, such as a guillotine damper, for controlling such a fluid flow. A typical application for such an apparatus is control of the flow through a duct of hot flue gases from a power plant.

2. Description of the Prior Art

It is known to provide guillotine-type dampers for the control of hot fluids in a duct, typically hot flue gases from a power plant. Such a device is disclosed in U. S. Pat. No. 4,088,146 to the present inventor. In such an apparatus, the closure member or damper blade is movable between an open position, in which the damper blade is removed entirely from the fluid passageway of the damper, and a closed position, in which the damper blade extends entirely across the fluid passageway.

The closure member or damper blade is subject to differential heating when in the closed position. Hot gases impinge only upon the upstream side of the damper blade, causing a differential temperature between the upstream and downstream sides. In addition, the damper blade, even when in the closed position, has a portion which extends outside of the fluid passageway. The section outside the fluid passageway is not subject to direct impingement of the hot gases, thus causing that section to be cooler, resulting in further differential temperatures in different parts of the blade.

The result of the differential temperatures is stress and distortion of the damper blade, which in turn can lead to cracking and early failure, which may cause binding of the damper blade in the mechanism for moving it, and which may cause damage to other parts of the damper, such as the seals of the damper, when the damper blade is moved.

It has previously been proposed to divide damper blades, valve members or other heated components into sections to better accommodate differential heating. Such constructions are shown in U.S. Pat. Nos. 1,734,450 to Smith, 1,995,845 to Flintermann, 1,934,928 to Jackson, 1,932,243 to Clark, and U.S. Pat. Nos. 1,643,766, 1,798,460 and 1,991,016 to Fahrenwald.

Nevertheless, such sectional-type constructions have involved multiple pieces joined together throughout the structure, without regard to the particular hot or cold characteristics of each particular region of the component. The use of such multiple pieces creates sealing problems and complicates construction. The end result has been designs which are intricate, which would be expensive to build, and which may be subject to leakage problems.

OBJECTS OF THE INVENTION

It is, accordingly, an object of the present invention to overcome the drawbacks of the prior art.

It is another object of the present invention to provide a closure member for an apparatus for controlling a hot fluid, which closure member is simple in construction and economical to build, and yet which accommodates differential heating throughout the closure member, such differential heating stemming from impingement of hot fluid on only a portion of the closure member.

It is yet another object of the present invention to provide a closure member which accommodates differential heating due to impingement of hot fluid on only one portion thereof without the use of any joints, sections or gaps in the closure member in any portion which will be subject to impingement of hot fluid.

It is a related object of the present invention to provide a closure member for a fluid control device which accommodates differential heating due to impingement of hot fluid on only a portion of the closure member and yet which does not itself create any opportunities for fluid leaks in the portion of the closure member subject to the impingement of hot fluid.

It is also an object of the present invention to provide a flow control apparatus using a closure member which is simple in construction, economical to build, and which facilitates expansion of a portion not subjected to impingement of hot fluids upon expansion of another section which is subject to such impingement.

It is yet another object of the present invention to provide a closure member which is simple in construction, economical to build, and yet which effects relief of stresses and reduction of the extent of distortion, which stresses and distortion would otherwise result from exposure to hot fluid on only a portion of the closure member.

These and other objects, advantages and aspects of the present invention will be more apparent from the following detailed description and claims, with reference to the accompanying drawings.

SUMMARY OF THE INVENTION

According to the present invention, there is provided an apparatus for controlling the flow of a hot fluid, which apparatus includes a closure member with a hot section and a cold section and at least one cleft in the cold section of the closure member. More specifically, the apparatus includes a body and a fluid passageway through the body. The closure member is arranged for sliding movement between a closed position, wherein the closure member extends into the fluid passageway to restrict the flow of fluid therethrough, and an open position, wherein the closure member is withdrawn from the fluid passageway. The closure member has a portion disposed outside the fluid passageway, even in the closed condition. This portion outside of the fluid passageway constitutes a cold section of the closure member.

The closure member also has a hot section defined by that portion of the closure member which is in the fluid passageway and subject to impingement by a hot fluid when the closure member is in the closed condition.

As indicated, there is a cleft in the cold section of the closure member whereby, upon expansion of the hot section of the closure member due to impingement of a hot fluid, the cleft in the cold section facilitates a corresponding expansion of the cold section to relieve stresses and reduce the extent of distortion of the closure member.

DETAILED DESCRIPTION

Figure 3:
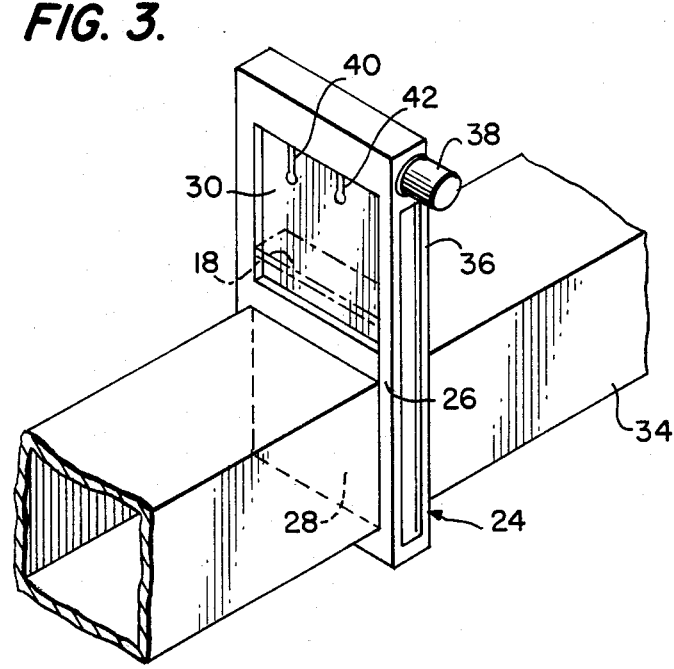
FIG. 3 is an isometric view of a fluid control device, specifically a guillotine damper, according to the present invention and shows the damper disposed in a duct.

In the following description and in the drawings, like reference characters used among the various figures of the drawings refer to like elements or features.

Figure 1:
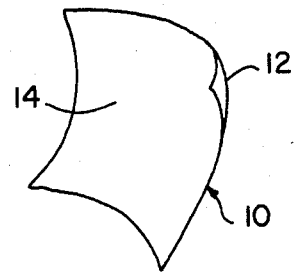
FIG. 1 is an isometric view showing in exaggerated form the deformation of a plate-like closure member when subjected to the impingement of a hot fluid on only one side.

FIG. 1 depicts the deformation of a plate-like closure or damper blade 10 when it is in a closed position and subject to impingement of a hot fluid, such as hot flue gases from a power plant. Plate 10 has an upstream, hot side 12 subject to impingement of the hot gases and a downstream, cold side 14 which is not directly exposed to the hot gases. As the temperature increases on hot side 12, its dimensions increase, i.e., hot side 12 grows and expands. Because its temperature is higher than that of cold side 14, hot side 12 tends to expand more than cold side 14. This tendency toward greater expansion on one side than the other, in turn, causes distortion of the plate-like closure 10, which distortion is illustrated in exaggerated form in FIG. 1. As will be seen from FIG. 1, the distortion entails a cupping of the plate-like closure 10 such that the cold side 14 becomes somewhat concave, the hot side 12 becomes somewhat convex, and the corners curl toward the cold side 14.

Plate-like closure members, such as damper blades, used in practice, undergo distortion which is more complex than that of FIG. 1. This is because the plate-like closure 10, aside from having one entire side 14 which is not directly exposed to the hot gases, will also have an area or region which will always be outside the fluid passageway, even when the closure member is in the fully closed position. This outside area or region tends to expand less than the region within the damper. The region which will be inside the fluid passageway when the plate-like closure is in a closed position is referred to as the hot section and is designated by reference numeral 16. The remaining section, i.e., the section which is not within the fluid passageway and which extends outwardly thereof, is referred to as the cold section and designated by reference numeral 18. Cold section 18 is used to attach a coupling and mechanism for moving the closure member between closed and open positions.

Figure 2:
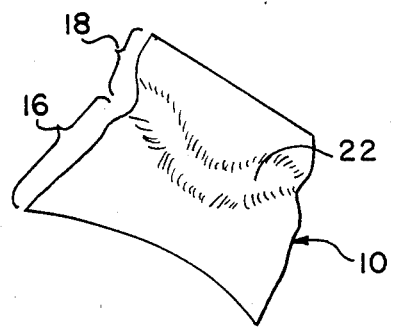
FIG. 2 is an isometric view, also of a plate-like closure member, showing in exaggerated form the distortion thereof due to impingement of hot fluid only on the upstream side and also due to impingement of the hot fluid on only the portion thereof which extends into the fluid passageway and not the portion which will remain outside the fluid passageway when the closure member is in a closed position.

The distortion caused by: (a) the differential temperatures between hot side 12 and cold side 14 of the portion of the plate-like closure 10 disposed within the fluid passageway, i.e., the differential temperatures in the hot section 16 itself, and (b) the differential temperatures between the hot section 16 and the cold section 18, is shown in exaggerated form in FIG. 2. Hot section 16 will have a tendency to deform in the manner illustrated in FIG. 1, yet cold section 18 will have a tendency not to deform, since neither its upstream nor its downstream side is subject to impingement of hot gases, even when the closure 10 is in the fully closed position. This tends to cause an irregular buckling type of deformation between hot and cold sections 16, 18 as illustrated in exaggerated form in FIG. 2 by reference numeral 22. As seen in FIG. 2, buckled area 22 tends to form a wavy path of high and low regions across the closure 10 in the general area between hot and cold sections 16, 18. In a 20-foot wide damper blade, measured distortions in the buckled area 22 of one and one-half inches in directions perpendicular to the plane of the blade have been made from high to low points in a blade constrained by guides. The distortion could well be greater were the damper blade not constrained by guides.

The above-described deformation of the damper blade causes significant internal stresses which can lead to cracks and early failure. It can also cause binding of the blade and make movement of the blade difficult or impossible. Such deformation can also lead to damage of other components in the valve or damper when one attempts to move the distorted blade between open and closed positions.

Turning to the present invention, the general environment thereof will be described in connection with FIG. 3. As shown there, a damper, generally referred to by reference numeral 24, includes a body or frame 26 defining a fluid passageway 28 through the body. A closure member 30 is carried by the body 26 for sliding movement between a closed position as shown in phantom lines in FIG. 3, wherein closure member 30 extends into the fluid passageway 28 to restrict the flow of fluid through the passageway, and an open position, shown in solid lines in FIG. 3, wherein the closure member is withdrawn from passageway 28. The closure member has a portion 18 disposed outside fluid passageway 28 even when the closure member is in the closed condition. This outside portion 18 corresponds with the cold section previously referred to in connection with FIG. 2 and will be referred to as the cold section. Closure member 30 also has a hot section 16, selectively disposed within the fluid passageway 28, which section corresponds with the hot section referred to in connection with FIG. 2. Hot section 16 is shown in the environment of the invention more particularly in FIGS. 4 and 5. Fluid passageway 28 of the damper 24 communicates with a duct 34, whereby the damper 24 controls the flow of fluid through duct 34.

Damper 24 includes an extended framework 36 which accommodates closure member 30 when in an open position and guides its movement into that position. Specifically, when closure member 30 moves from a closed position to an open position, it will, from the perspective of the particular orientation shown in FIG. 3, be drawn upwardly into the upper framework 36 by a motor 38 cooperating with an appropriate drive mechanism, such as a chain drive (not shown.) Likewise, when closure 30 moves into a closed position, it will be lowered (from the perspective of the particular orientation of FIG. 3) through the upper framework 36 into a position as shown in phantom lines in FIG. 3.

Figure 4:
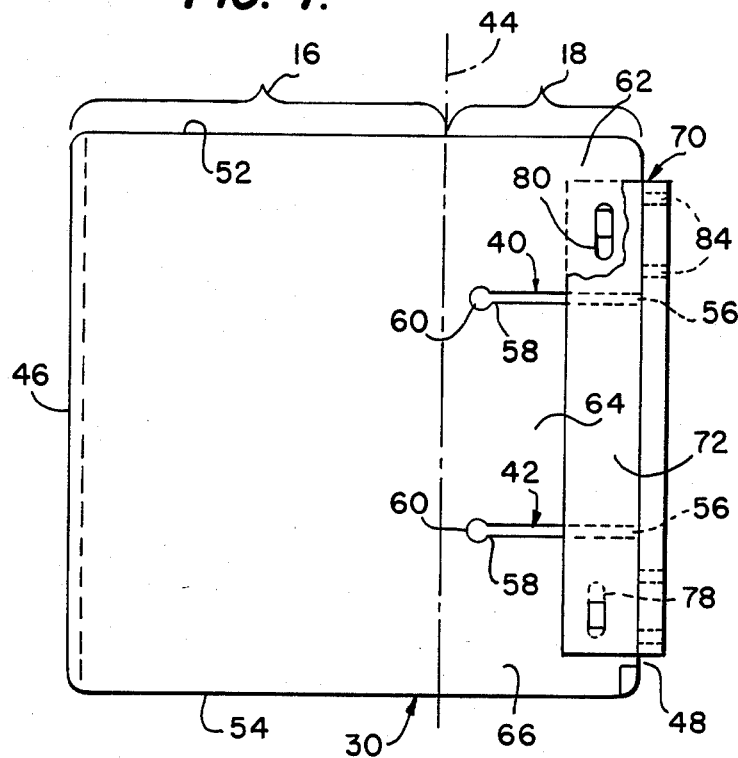
FIG. 4 is a plan view of the closure member of the present invention.
Figure 6:
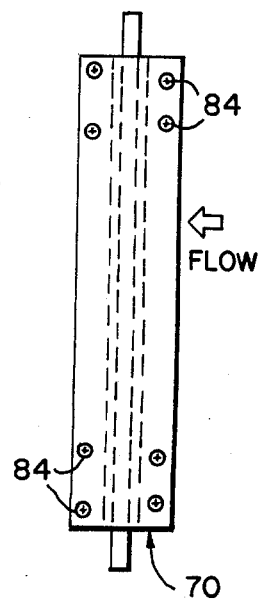
FIG. 6 is a top elevation of the closure member of FIG. 4.
Figure 5:
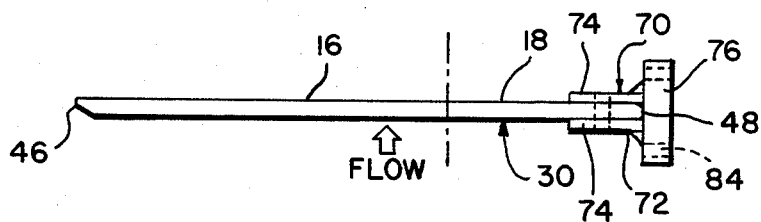
FIG. 5 is a side elevation of the closure member of FIG. 4.
Figure 7:
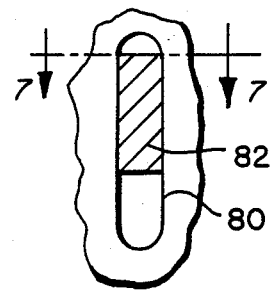
FIG. 7 is a detailed view of the connection between the clevis and the closure member.

Referring to FIG. 4, there is, according to the present invention, at least one cleft 40 in the cold section 18 of the closure member, and preferably a plurality of such clefts 40, 42. Upon expansion of the hot section 16 of closure member 30 due to impingement of hot fluid on closure member 30, clefts 40, 42 in cold section 18 facilitate corresponding expansion of the cold section 18 and relieve stresses and reduce the extent of distortion of closure member 30.

In FIG. 4, phantom line 44 represents the line of demarkation between the hot and cold sections 16, 18. It will be seen that clefts 40, 42 are disposed entirely within cold section 18. That is, hot section 16 is free of any cleft. Notwithstanding the clefts 40, 42 in the closure member 30, the hot and cold sections 16, 18 making up closure member 30 are composed of a single, integral, unitary, onepiece, flat, planar, plate-like member.

Closure member 30 is defined by edges including a leading edge 46, a trailing edge 48, and a pair of lateral edges 52, 54. Leading edge 46 borders on hot section 16. Trailing edge 48 borders on cold section 18, is disposed opposite leading edge 46, and is generally parallel thereto. Lateral edges 52, 54 run generally parallel to each other between leading and trailing edges 46, 48. Clefts 40, 42 extend from trailing edge 48 partially into closure member 30. More specifically, clefts 40, 42 are elongated and run from trailing edge 48 in a direction toward leading edge 46. Clefts 40, 42 run approximately parallel to lateral edges 52. Each cleft 40, 42 has the form of a slot, and each slot has an entrance 56 located where the slot meets the trailing edge 48. The slot of each cleft 40, 42 also has an end 58 located where the slot terminates in the closure member 30. A rounded opening 60 is disposed at each end 58 of each slot. Rounded opening 60 is preferably wider than the width of the slot and preferably has the form of a circle, the diameter of which circle is greater than the width of the slot.

In actual practice, each slot constituting a cleft 40, 42 has had a width of approximately 0.06–0.12 inch when cold, which slot has been flame cut into a flat plate forming closure member 30. The rounded opening 60 at the end of each slot has had a diameter of approximately one-half inch. This rounded opening or curvature at the end 58 of each slot forming a cleft 40, 42 reduces stress concentrations at end 58 of each slot to prevent cracks from forming at the slot ends and to reduce the possibility of failure of the closure member.

With the construction as described, the cold section 18 is allowed to expand along with the hot section 16 in response to impingement of a hot fluid, such as a flue gas, on the hot section 16 of closure member 30. That is, the clefts 40, 42 reduce the resistance of cold section 18 to also expand along with hot section 16. In other words, clefts 40, 42 allow the entire closure 30 to expand.

During expansion of hot section 16 due to impingement of hot gases and consequent expansion of cold section 18, clefts 40, 42 become larger. There is nearly, but not exactly, a parallel expansion of the sides of the slot forming each cleft 40, 42, and this is because the part of the cold section 18 closest to hot section 16 will be warmer than the part of the cold section 18 farthest from hot section 16.

During such expansion, clefts 40, 42 become larger. This relieves part of the stress caused by the expansion of the hot section 16 by dividing the stress into smaller amounts. That is, division of the cold section 18 into a number of separate areas, i.e., area 62 outside cleft 40, area 64 between clefts 40, 42, and area 66 outside cleft 42, provides a cold section 18 with three generally separate areas. This, in turn, distributes what would have been the overall stress on the cold section 18 into three smaller areas to provide less stress buildup in any one area and less distortion in any one area.

The tendency of the closure member 30 to distort is a function of its thickness and size. By, in effect, reducing the size, i.e., reducing the crosswise dimension of the cold section 18 by dividing it into three parts, the extent of distortion is reduced. The extent of the distortion to be allowed is limited to the amount that can be accommodated by the seals and operating mechanism of the valve or damper.

Figure 8:
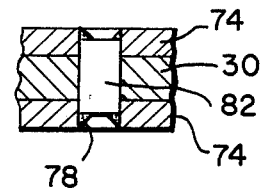
FIG. 8 is a fragmentary, detailed, sectional view taken on the line 7—7 of FIG. 7.

Turning to the operating mechanism, closure member 30 includes a coupling 70 by which closure member 30 may be coupled with an operating mechanism for moving closure 30 between open and closed positions. Coupling 70 includes a clevis 72 having a pair of spaced legs 74 extending perpendicularly from a base 76. Legs 74 are parallel to the main plane of closure member 30, and base 76 is perpendicular to that plane. In at least one of the legs 74 of clevis 72 are a set of apertures 78. Another set of apertures 80 are disposed in cold section 18 and are arranged to register with apertures 78 to provide cooperating sets of apertures 78, 80. A pin 82 extends between apertures 78, 80 of each set to lock the clevis 72 to the cold section 18 of closure member 30. As seen in FIG. 8, pin 82 may be welded into place. Clevis 72 includes a set of bores 84 in base 76 into which fasteners extend to connect closure member 30 to the lifting and lowering mechanism in the extended framework 36, which mechanism is driven by motor 38.

While the invention has been described by way of a preferred embodiment, many variations and modifications are possible. It will be understood that the invention is not limited by the foregoing description, but rather is limited only by the scope of the appended claims.

What is claimed is:

1. An apparatus for controlling the flow of hot fluid comprising:
    (a) a body;
    (b) a fluid passageway through said body;
    (c) a closure member for sliding movement between a closed position, wherein said closure member extends into said fluid passageway to restrict the flow of fluid therethrough, and an open position, wherein said closure member is withdrawn from said passageway, said closure member having a portion disposed outside said fluid passageway even in the closed condition;
    (d) said closure member having a hot section defined by that portion of the closure which is in the fluid passageway and subject to impingement by hot fluid when the closure member is in its closed position;
    (e) said closure member having a cold section defined by that portion of the closure member which is outside said fluid passageway when the closure member is in the closed position;
    (f) a cleft in said cold section of said closure member, said cleft being disposed entirely within said cold section; and
    (g) whereby, upon expansion of said hot section of said closure member due to impingement of hot fluid thereon, said cleft in said cold section facilitates expansion of said cold section to relieve stresses and to reduce the extent of distortion of the closure member.

2. The invention as claimed in claim 1, wherein said hot section is free of any cleft.

3. The invention as claimed in claim 1, wherein said hot and cold sections are composed of an integral, unitary, one-piece, flat, planar, plate-like member.

4. The invention as claimed in claim 1 including a plurality of clefts in said cold section.

5. An apparatus for controlling the flow of hot fluid comprising:
 (a) a body;
 (b) a fluid passageway through said body;
 (c) a closure member for sliding movement between a closed position, wherein said closure member extends into said fluid passageway to restrict the flow of fluid therethrough, and an open position, wherein said closure member is withdrawn from said passageway, said closure member having a portion disposed outside said fluid passageway even in the closed condition;
 (d) said closure member having a hot section defined by that portion of the closure which is in the fluid passageway and subject to impingement by hot fluid when the closure member is in its closed position; and
 (e) means in said cold section of said closure member for facilitating expansion of said cold section in response to expansion of said hot section due to heating by impingement of hot fluid on said hot section to relieve stress and to reduce the extent of distortion of the closure member, said expansion facilitating means including a cleft in said cold section of said closure member.

6. The invention as claimed in claim 5, wherein said cleft is disposed entirely within said cold section.

7. The invention as claimed in claim 5, wherein said hot section is free of any cleft.

8. The invention as claimed in claim 5, wherein said hot and cold sections are composed of an integral, unitary, one-piece, flat, planar, plate-like member.

9. The invention as claimed in claim 5 including a plurality of clefts in said cold section.

10. A closure member which moves between an open and closed position in an apparatus which controls the flow of hot fluid through a fluid passageway, the closure member comprising:
 (a) a hot section which is subject to impingement of hot fluid when the closure member is in a closed position;
 (b) a cold section which joins the hot section and which is not subject to impingement of hot fluid when the closure member is in the closed position; and
 (c) a cleft in said cold section of said closure member, said cleft being disposed entirely within said cold section;
 whereby, upon expansion of said hot section of said closure member due to impingement of hot fluid thereon, said cleft in said cold section facilitates expansion of said cold section to relieve stresses and to reduce the extent of distortion of the closure member.

11. The invention as claimed in claim 10, wherein said hot section is free of any cleft.

12. The invention as claimed in claim 10, wherein said hot and cold sections are composed of an integral, unitary, one-piece, flat, planar, plate-like member.

13. The invention as claimed in claim 10 including a plurality of clefts in said cold section.

14. An apparatus for controlling the flow of hot fluid comprising:
 (a) a body;
 (b) a fluid passageway through said body;
 (c) a closure member for sliding movement between a closed position, wherein said closure member extends into said fluid passageway to restrict the flow of fluid therethrough, and an open position, wherein said closure member is withdrawn from said passageway, said closure member having a portion disposed outside said fluid passageway even in the closed condition;
 (d) said closure member having a hot section defined by that portion of the closure which is in the fluid passageway and subject to impingement by hot fluid when the closure member is in its closed position;
 (e) said closure member having a cold section defined by that portion of the closure member which is outside said fluid passageway when the closure member is in the closed position, said closure member being defined by edges;
 (f) a cleft in said cold section of said closure member, said cleft extending from one of said edges of said closure member partially into the closure member;
 (g) whereby, upon expansion of said hot section of said closure member due to impingement of hot fluid thereon, said cleft in said cold section facilitates expansion of said cold section to relieve stresses and to reduce the extent of distortion of the closure member.

15. The invention as claimed in claim 14, wherein one of said edges is a leading edge in said hot section, another edge is a trailing edge in said cold section, said trailing edge being disposed opposite the leading edge, and two additional edges are lateral edges running between said leading and trailing edges, said cleft being elongated, said cleft running from said trailing edge in a direction toward said leading edge.

16. The invention as claimed in claim 15, wherein said cleft runs approximately parallel to said lateral edges.

17. The invention as claimed in claim 14, wherein said cleft has the form of a slot and wherein said slot has an entrance located where said slot meets said one edge and an end located where said slot terminates in the closure member and including a rounded opening at said end of said slot.

18. The invention as claimed in claim 17, wherein said rounded opening is wider than said slot.

19. The invention as claimed in claim 18, wherein said rounded opening has the form of a circle, the diameter of which circle is greater than the width of said slot.

20. An apparatus for controlling the flow of hot fluid comprising:
 (a) a body;
 (b) a fluid passageway through said body;
 (c) a closure member for sliding movement between a closed position, wherein said closure member extends into said fluid passageway to restrict the flow of fluid therethrough, and an open position, wherein said closure member is withdrawn from said passageway, said closure member having a portion disposed outside said fluid passageway even in the closed condition;
 (d) said closure member having a hot section defined by that portion of the closure which is in the fluid passageway and subject to impingement by hot fluid when the closure member is in its closed position;

(e) said closure member having a cold section defined by that portion of the closure member which is outside said fluid passageway when the closure member is in the closed position;

(f) a cleft in said cold section of said closure member, whereby, upon expansion of said hot section of said closure member due to impingement of hot fluid thereon, said cleft in said cold section facilitates expansion of said cold section to relieve stresses and to reduce the extent of distortion of the closure member; and (g) a coupling joining said cold section, by which coupling the closure member may be moved between the open and closed positions, said coupling including a clevis having a first aperture therein, a second aperture in the cold section arranged to register with the first aperture to provide cooperating sets of first and second apertures, and a pin extending between said first and second apertures of each set to lock said clevis to said cold section.

21. An apparatus for controlling the flow of hot fluid comprising:

(a) a body;

(b) a fluid passageway through said body;

(c) a closure member for sliding movement between a closed position, wherein said closure member extends into said fluid passageway to restrict the flow of fluid therethrough, and an open position, wherein said closure member is withdrawn from said passageway, said closure member having a portion disposed outside said fluid passageway even in the closed condition;

(d) said closure member having a hot section defined by that portion of the closure which is in the fluid passageway and subject to impingement by hot fluid when the closure member is in its closed position, said closure member being defined by edges; and (e) means in said cold section of said closure member for facilitating expansion of said cold section in response to expansion of said hot section due to heating by impingement of hot fluid on said hot section to relieve stresses and to reduce the extent of distortion of the closure member, said expansion facilitating means including a cleft in said cold section of said closure member, said cleft extending from one of said edges of said closure member partially into said closure member.

22. The invention as claimed in claim 21, wherein one of said edges is a leading edge in said hot section, another edge is a trailing edge in said cold section, said trailing edge being disposed opposite the leading edge, and two additional edges are lateral edges running between said leading and trailing edges, said cleft being elongated, said cleft running from said trailing edge in a direction toward said leading edge.

23. The invention as claimed in claim 22, wherein said cleft runs approximately parallel to said lateral edges.

24. The invention as claimed in claim 21, wherein said cleft has the form of a slot and wherein said slot has an entrance located where said slot meets said one edge and an end located where said slot terminates in the closure member and including a rounded opening at said end of said slot.

25. The invention as claimed in claim 24, wherein said rounded opening is wider than said slot.

26. The invention as claimed in claim 25, wherein said rounded opening has the form of a circle, the diameter of which circle is greater than the width of said slot.

27. An apparatus for controlling the flow of hot fluid comprising:

(a) a body;

(b) a fluid passageway through said body;

(c) a closure member for sliding movement between a closed position, wherein said closure member extends into said fluid passageway to restrict the flow of fluid therethrough, and an open position, wherein said closure member is withdrawn from said passageway, said closure member having a portion disposed outside said fluid passageway even in the closed condition;

(d) said closure member having a hot section defined by that portion of the closure which is in the fluid passageway and subject to impingement by hot fluid when the closure member is in its closed position; and (e) means in said cold section of said closure member for facilitating expansion of said cold section in response to expansion of said hot section due to heating by impingement of hot fluid on said hot section to relieve stress and to reduce the extent of distortion of the closure member; and (f) a coupling joining said cold section, by which coupling the closure member may be moved between the open and closed positions, said coupling including a clevis having a first aperture therein, a second aperture in the cold section arranged to register with the first aperture to provide cooperating sets of first and second apertures, and a pin extending between cold section to relieve stresses and to reduce the extent of distortion of the closure member.

28. A closure member which moves between an open and closed position in an apparatus which controls the flow of hot fluid through a fluid passageway, the closure member comprising:

(a) a hot section which is subject to impingement of hot fluid when the closure member is in a closed position;

(b) a cold section which joins the hot section and which is not subject to impingement of hot fluid when the closure member is in the closed position;

(c) a set of edges defining the closure member; and (d) a cleft in said cold section of said closure member, said cleft extending from one of said edges of the closure member partially into the closure member; whereby, upon expansion of said hot section of said closure member due to impingement of hot fluid thereon, said cleft in said cold section facilitates expansion of said cold section to relieve stresses and to reduce the extent of distortion of the closure member.

29. The invention as claimed in claim 28, wherein one of said edges is a leading edge in said hot section, another edge is a trailing edge in said cold section, said trailing edge being disposed opposite the leading edge, and two additional edges are lateral edges running between said leading and trailing edges, said cleft being elongated, said cleft running from said trailing edge in a direction toward said leading edge.

30. The invention as claimed in claim 29, wherein said cleft runs approximately parallel to said lateral edges.

31. The invention as claimed in claim 28, wherein said cleft has the form of a slot and wherein said slot has an entrance located where said slot meets said one edge and an end located where said slot terminates in the closure member and including a rounded opening at said end of said slot.

32. The invention as claimed in claim 31, wherein said rounded opening is wider than said slot.

33. The invention as claimed in claim 32, wherein said rounded opening has the form of a circle, the diameter of which circle is greater than the width of said slot.

34. A closure member which moves between an open and closed position in an apparatus which controls the flow of hot fluid through a fluid passageway, the closure member comprising:
    (a) a hot section which is subject to impingement of hot fluid when the closure member is in a closed position;
    (b) a cold section which joins the hot section and which is not subject to impingement of hot fluid when the closure member is in the closed position; and
    (c) a cleft in said cold section of said closure member, whereby, upon expansion of said hot section of said closure member due to impingement of hot fluid thereon, said cleft in said cold section facilitates expansion of said cold section to relieve stresses and to reduce the extent of distortion of the closure member; and
    (d) a coupling joining said cold section, by which coupling the closure member may be moved between the open and closed positions, said coupling including a clevis having a first aperture therein, a second aperture in the cold section arranged to register with the first aperture to provide cooperating sets of first and second apertures, and a pin extending between said first and second apertures of each set to lock said clevis to said cold section.

* * * * *